United States Patent
Pelissier et al.

(10) Patent No.: US 11,586,325 B1
(45) Date of Patent: Feb. 21, 2023

(54) INFORMATION HANDLING SYSTEM STYLUS LOCATION AID HAVING SELECTABLE VIBRATION

(71) Applicant: Dell Products L.P., Round Rock, TX (US)

(72) Inventors: Gerald R. Pelissier, Mendham, NJ (US); Peng Lip Goh, Singapore (SG); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/472,030

(22) Filed: Sep. 10, 2021

(51) Int. Cl.
| | | |
|---|---|---|
| G06F 3/043 | (2006.01) | |
| G06F 3/01 | (2006.01) | |
| G06F 3/16 | (2006.01) | |
| G06F 3/038 | (2013.01) | |
| G06F 3/0354 | (2013.01) | |
| H04B 17/318 | (2015.01) | |
| G06F 3/041 | (2006.01) | |

(52) U.S. Cl.
CPC ............ *G06F 3/0433* (2013.01); *G06F 3/016* (2013.01); *G06F 3/0383* (2013.01); *G06F 3/03542* (2013.01); *G06F 3/03545* (2013.01); *G06F 3/04162* (2019.05); *G06F 3/16* (2013.01); *H04B 17/318* (2015.01); *G06F 2203/0384* (2013.01)

(58) Field of Classification Search
CPC .... G06F 3/0433; G06F 3/04162; G06F 3/016; G06F 3/03542; G06F 3/03545; G06F 3/0383; G06F 3/16; G06F 2203/0384; H04B 17/318
See application file for complete search history.

(56) References Cited

U.S. PATENT DOCUMENTS

| | | | |
|---|---|---|---|
| 9,430,106 B1* | 8/2016 | Olsen | A63F 13/426 |
| 2011/0115754 A1* | 5/2011 | Cruz-Hernandez | G06F 3/0362 340/407.1 |
| 2021/0182546 A1* | 6/2021 | Tsuji | G06F 40/242 |

OTHER PUBLICATIONS

Businesswire, "Elliptic Labs Announces Next Era of Smart Sensors for Presence Detection," Elliptic Labs, Jan. 3, 2020, 3 pages.
Comsol, "Elliptic Labs Expands its Ultrasound Sensing Framework to More Devices and Mobile Platforms," Special Edition Acoustics, Nov. 19, 2020, 10 pages.
Microchip Technology, "HV56020 Dual 250V Haptic Drive Amp Array w/Boost," downloaded from https://www.microchip.com/en-us/product/HV56020 on Sep. 10, 2021, 4 pages.

(Continued)

*Primary Examiner* — Jonathan A Boyd
(74) *Attorney, Agent, or Firm* — Zagorin Cave LLP; Robert W. Holland

(57) ABSTRACT

A portable information handling system commands a stylus to vibrate to aid in location of the stylus. The stylus vibrates at a frequency selected from a range of plural frequencies based upon a distance between the portable information handling system and stylus so that an audible noise is generated by the stylus with sufficient sound to be heard by a user of the portable information handling system while minimizing stylus power consumption. In one embodiment, a haptic film at the stylus exterior surface generates an ultrasonic noise detectable by a microphone of the portable information handling system for determining a vector to the stylus.

17 Claims, 11 Drawing Sheets

(56) References Cited

OTHER PUBLICATIONS

Kemet Engineering Center, "Integration of Electro-Active Polymer Actuators on to Flexible and Rigid Substrates," downloaded from https://ec.kemet.com/blog/integration-of-electro-active-polymer-actuators-on-to-flexible-and-rigid-substrates/ on Sep. 10, 2021, 13 pages.
Poly, "Voyager 5200 Series," downloaded from https://www.poly.com/us/en/products/headsets/voyager/Voyager-5200 on Sep. 10, 2021, 6 pages.
Skullcandy, "Zero Boundaries. Max Performance. Push Ultra True Wireless Earbuds," downloaded from https://www.skullcandy.com/shop/earbuds/bluetooth-earbuds/push-ultraon Sep. 10, 2021, 17 pages.
Bose, SoundSport wireless headphones, downloaded from https://www.bose.com/en_us/products/headphones/earbuds/soundsport-wireless.html#v=soundsport_wireless_citron on Sep. 10, 2021, 14 pages.
Tile, "Mate The Versatile Finder," downloaded from https://www.thetileapp.com/en-us/store/tiles/mate on Sep. 10, 2021, 8 pages.

\* cited by examiner

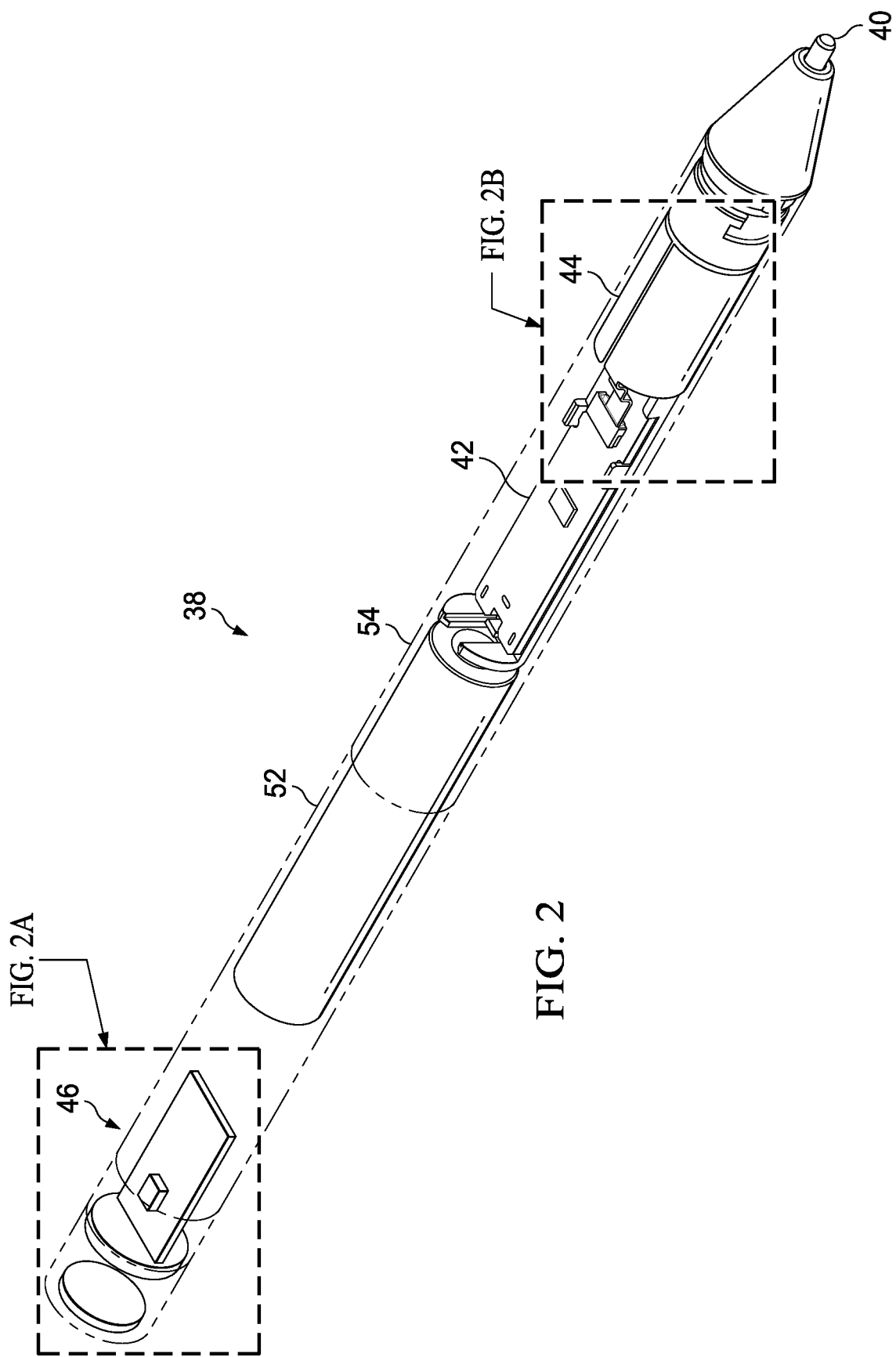

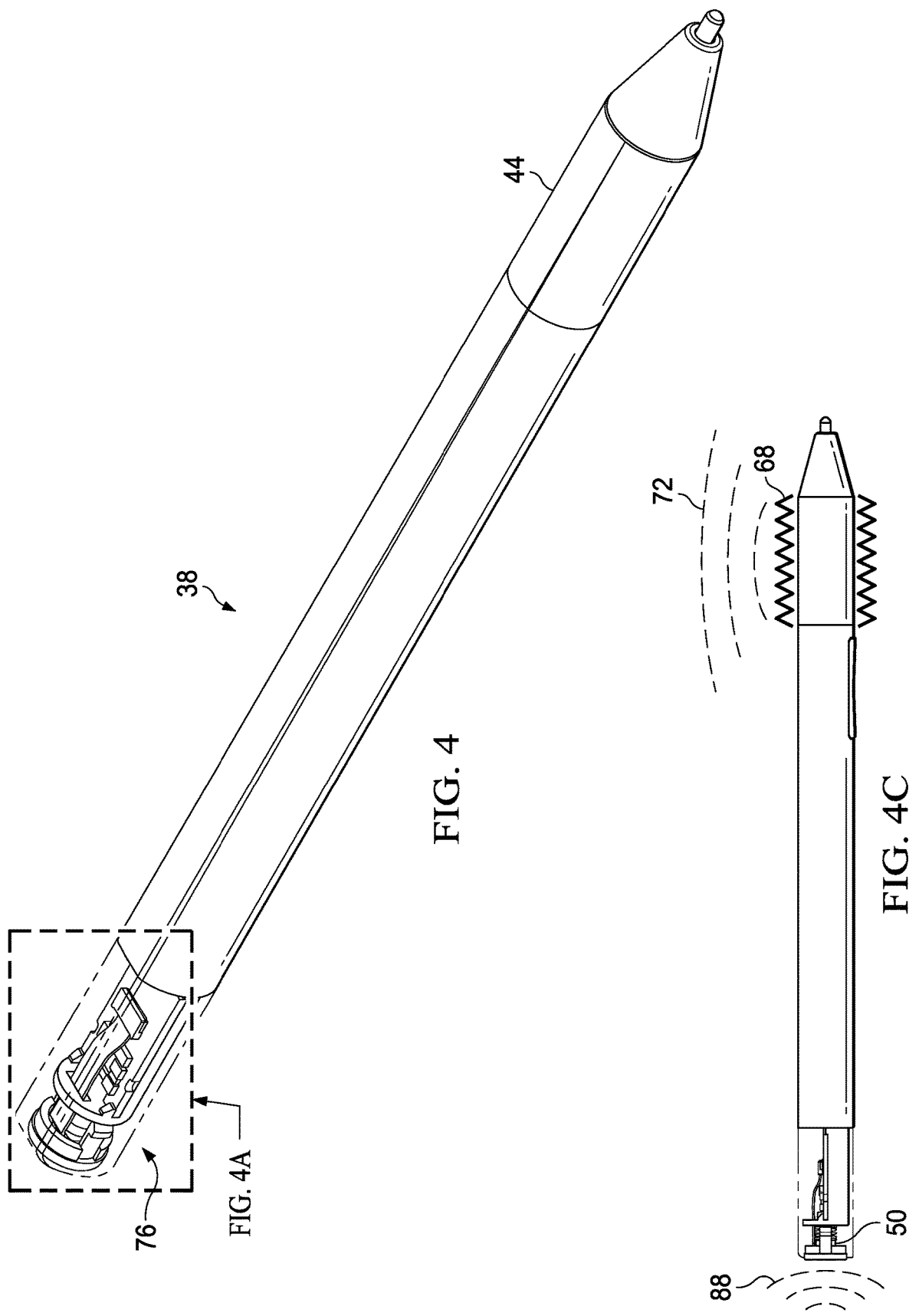

INFORMATION HANDLING SYSTEM STYLUS LOCATION AID HAVING SELECTABLE VIBRATION

BACKGROUND OF THE INVENTION

Field of the Invention

The present invention relates in general to the field of portable information handling system stylus devices, and more particularly to an information handling system stylus location aid having selectable vibration.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility. In many instances, convertible information handling systems will rotate the housing portions 360 degrees to a "tablet" position that exposes a touchscreen display for use as a tablet.

One tool that enhances the use of portable information handling systems is a stylus that supports end user "writing" inputs at a touchscreen display similar to writing with a pen on a piece of paper. An active stylus has an internal battery that powers internal processing components and an active writing tip, which increases the accuracy of touch detection. In many instances, active stylus devices include a BLUETOOTH or other wireless interface that coordinates stylus and information handling system interactions. Many stylus devices integrate expensive components that can make a stylus an expensive device to lose. Generally, a stylus can include one or both of an audible locator or a wireless locator. Audible locators are typically buzzers included in the stylus that direct an audible sound out an opening for an end user to hear. One difficulty with this approach is that the loudness of the buzzer can vary depending upon the orientation of the audio opening in the stylus housing so that a stylus facing in the wrong direction or covered by an object will be difficult to hear. Another difficulty is that the small size of the stylus, typically the size of a writing pen, limits the size of an integrated buzzer so that the sound output is limited, often to roughly 60 dB equivalent to normal conversation. In low ambient light conditions, the buzzer provides a general location but the precise location is difficult to determine. Wireless location, such as with a TILE type of functionality, helps to confirm the general location of a lost stylus but typically cannot provide a precise location. In addition, using a wireless location logic tends to increase power consumption at the stylus while the radio monitors for radio signals and sends position reports.

SUMMARY OF THE INVENTION

Therefore, a need has arisen for a system and method which aids location of a stylus relative to an information handling system.

In accordance with the present invention, a system and method are provided which substantially reduce the disadvantages and problems associated with previous methods and systems that aid in location of a stylus relative to an information handling system. A haptic film disposed in the stylus generates vibration at a frequency selected from a range of frequencies based upon an estimate of the distance between the information handling system and stylus. A high frequency haptic film vibration can generate an ultrasonic sound that an information handling system and stylus use to determine distance and vector information for tracking the stylus and determining how much haptic film vibration is desired to aid an end user in noticing the location of the stylus, such as with vibration noise.

More specifically, an information handling system processes information with processing components disposed in a housing, such as a portable planar tablet housing. A processor cooperates with a memory to execute instructions and present visual images at a touchscreen display configured to accept touch inputs by a stylus having an active writing tip and a wireless personal area network (WPAN) radio to communicate with the information handling system. A stylus locator having instructions stored in non-transient memory that execute on one or more processing resources to aid in location of the stylus by an end user, such as in response to an end user inquiry for the location of the stylus. A haptic film disposed at the stylus exterior vibrates at a frequency selected from a range of frequencies based upon a distance estimate between the stylus and information handling system, such as a distance estimate provided by wireless communication. The haptic film and a speaker on the information handling system may also provide ultrasonic noise between the stylus and information handling system that communicates messages, such as a time stamp, to allow distance and directional information of the stylus relative to the information handling system. In one embodiment, a light integrated in the stylus is selectively illuminated based upon ambient conditions detected at the information handling system or stylus.

The present invention provides a number of important technical advantages. One example of an important technical advantage is that a stylus position relative to an information handling system is provided with minimal power consumption at the stylus and minimal distraction to end users. For example, stylus vibration frequency and amplitude to provide a location aid to an end user is adjusted based upon an estimated distance between the stylus and information handling system so that less noise is generated at shorter distances and increased noise is generated at longer distances. The use of reduced vibration frequency and amplitude at shorter distances helps to reduce power consumption and also disruption to other nearby users. As another example, ultrasonic vibration provides location direction and distance of the stylus relative to the information handling system without disruption to an end user by an audible sound and allows tracking of the stylus position by an information handling system. Another example is that an LED light on the stylus is used for location only when sensed ambient light indicates that LED illumination will provide an effective location aid.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 2, 2A, 2B, 2C and 2D depict an isometric transparent view of the stylus configured with a haptic film at an exterior surface and an LED that provides illumination for location of the stylus;

FIGS. 4, 4A, 4B and 4C depict an example stylus that integrates a microphone and haptic film to aid in location of the stylus;

DETAILED DESCRIPTION

An information handling system and stylus coordinate to provide a location vibration at the stylus that varies based upon a distance between the information handling system and stylus. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
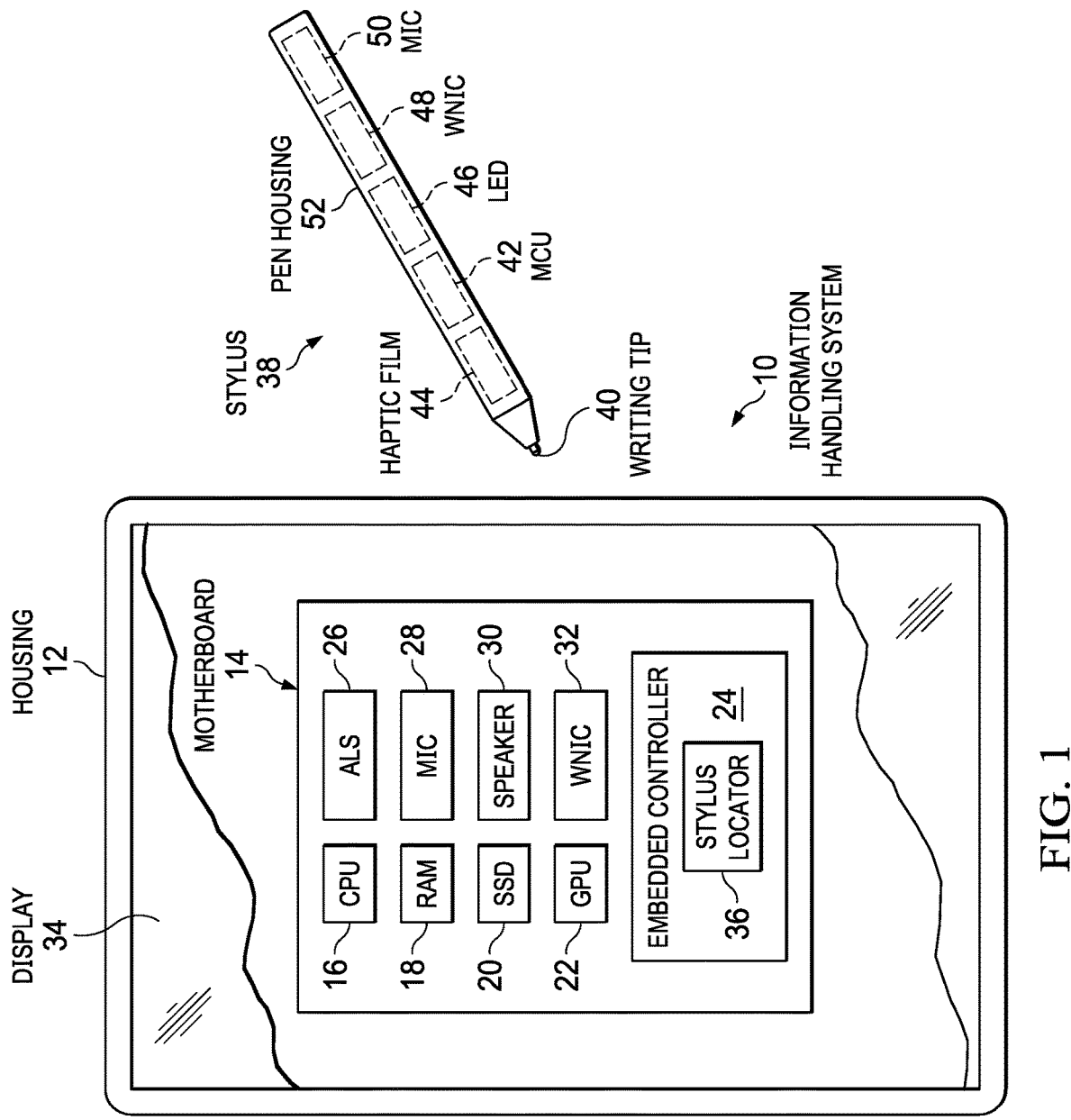
FIG. 1 depicts a block diagram of an information handling system and stylus having a location indication provided by haptic vibration at a frequency selected based upon a distance between the information handling system and stylus.

Referring now to FIG. 1, a block diagram depicts an information handling system 10 and stylus 38 having a location indication provided by haptic vibration at a frequency selected based upon a distance between the information handling system and stylus. In the example embodiment, information handling system 10 has a tablet configuration with processing components disposed in a portable planar housing 12 having a display 34 coupled over the processing components. A motherboard 14 couples to the interior of housing 12 and includes wirelines for communication between the processing components. A central processing unit (CPU) 16 executes instructions that process information in cooperation with a random access memory (RAM) 18 that stores the information and instructions. A solid state drive (SSD) 20 provides non-transient memory that stores the instructions and information during power down periods. For example, at power up of information handling system 10 firmware instructions of an embedded controller 24 execute to retrieve an operating system and applications from SSD 20 to RAM 18 for processing by CPU 16 to generate visual information for presentation at a display 34 with additional processing provided by a graphics processing unit (GPU) 22. Embedded controller 24 provides management functions for the processing components disposed in the housing, such as power management, thermal management and interactions with peripheral devices and sensors. For instance, in the example embodiment, an ambient light sensor (ALS) 26 detects ambient light conditions at information handling system 10 and communicates the ambient light conditions to embedded controller 24, which makes the ambient light conditions available to CPU 16. Embedded controller 24 manages interactions by CPU 16 with a microphone 28, which captures sounds as electronic signals, and with a speaker 30, which plays electronic signals as sounds. A wireless network interface card (WNIC) 32 includes a radio to support wireless communications with external devices, such as through wireless local area networks (WLANs) and wireless personal area networks (WPANs) like Bluetooth.

In the example embodiment, information handling system 10 communicates through the radio of WNIC 32 with stylus 38 that supports end user touch inputs through a writing tip 40 that touches display 34. Stylus 38 holds processing components to support touch inputs in a pen-shaped housing 52. A microprocessing unit (MCU) 42 has a processing resource to execute instructions stored in integrated non-transitory memory. MCU 42 interfaces with a haptic film 44 that vibrates at a frequency selected from a range of frequencies, as described in greater depth below. A light emitting diode (LED) 46 interfaces with MCU 42 to selectively provide illumination. A WNIC 48 includes a radio that provides wireless communication to information handling system 10, such as with a BLUETOOTH or other wireless personal area network (WPAN). A microphone 50 interfaced with MCU 42 and WNIC 48 detects sounds and converts the sounds to electronic signals that can be communicated to information handling system 10. Stylus 38 provides a convenient and powerful tool for performing touch inputs to a touchscreen of display 34, such as for drawing or writing. A difficulty with stylus 38 is that it can tend to get lost after use. Information handling system 10 and stylus 38 coordinate resources to help prevent stylus 38 from becoming lost and that helps to find stylus 38 when out of sight of an end user. Generally, the term "stylus" is used interchangeably herein with the term "pen" as the stylus is a type of pen that writes to an electronic device touchscreen display.

In the example embodiment, stylus 38 location for an end user is coordinated by a stylus locator 36 that executes on processing resources of one or more of CPU 16, embedded controller 24 and MCU 42. For example, stylus locator 36 is a set of instructions stored in non-transient memory, such as SSD 20 or flash memory of MCU 42, and executed to coordinate operation of haptic film 44, microphones 28 and 50, radios of WNIC 32 and 48, and speaker 30 so that sounds are generated and detected to aid in end user location of stylus 38, such as in response to an end user inquiry at a user interface presented at display 34 for the location of stylus 38. The instructions may be distributed between processing resources as an application, an operating system driver and a firmware module, or in other types of configurations. In one embodiment, haptic film 44 generates a vibration selected from a range of vibration frequencies based upon a distance determined between information handling system 10, such as a distance estimate determined by radio communications. At short distances of one meter or less, a reduced vibration of 300 Hz may be used that provides adequate noise for an end user to locate stylus 38 while consuming reduced power. At a longer distance, vibration of up to 20 KHz may be used with increased amplitude to generate a greater location noise. Vibrations of greater than 20 KHz may be used to generate ultrasonic noise that is inaudible to an end user but audible by microphones 28 and 50. Ultrasonic vibrations may provide messages between the stylus and information handling system, such as a time stamp that allows a determination of a distance between the stylus and information handling system with reference to the time of flight for sounds versus the speed of sound. In addition, ultrasonic noise at the stylus provides a directional vector for an information handling system directional microphone to provide tracking of the stylus location when not in use so that the end user inquiry for stylus location may be met with a mapped location even before vibrating the stylus with audible sounds.

Figure 2A:
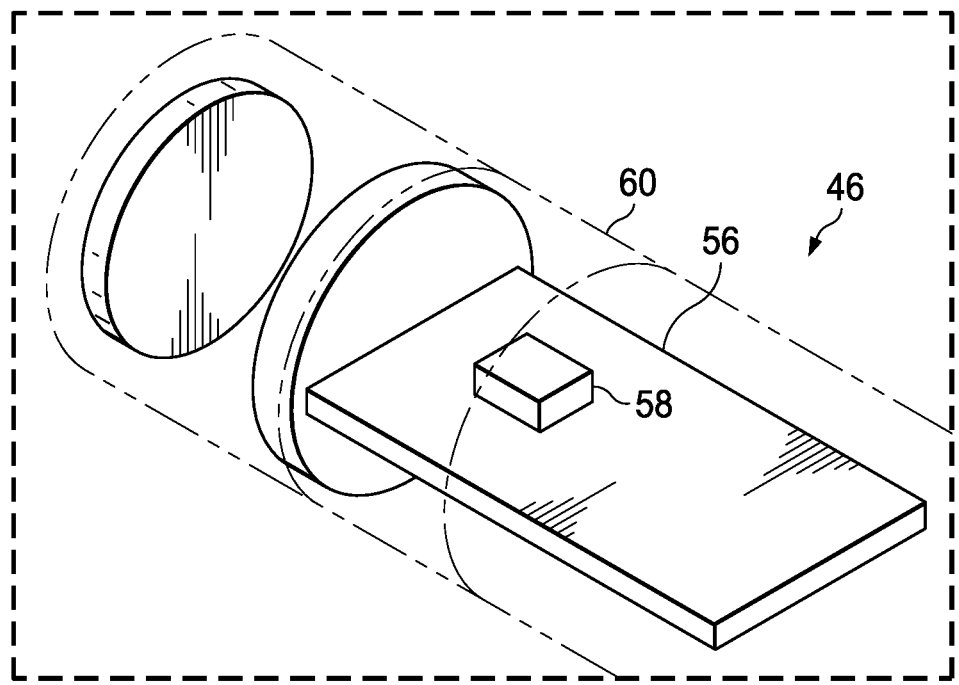
Figure 2B:
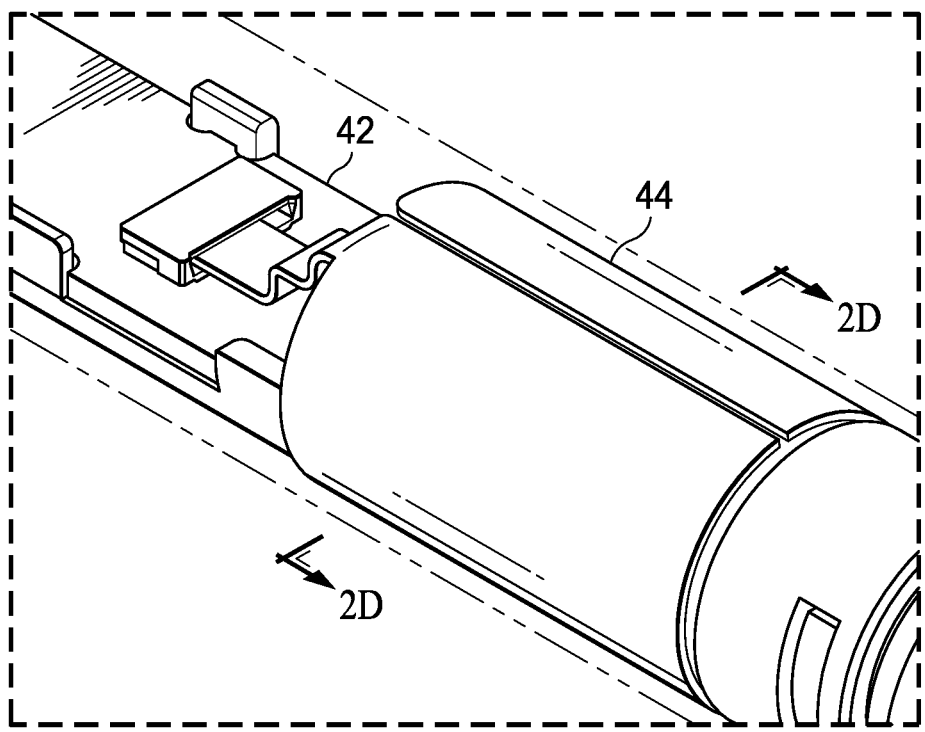

Referring now to FIGS. 2, 2A, 2B, 2C and 2D, an isometric transparent view depicts the stylus 38 configured with a haptic film 44 at an exterior surface and an LED 46 that provides illumination for location of the stylus. Haptic film 44 couples at an exterior surface of stylus 38 housing 52 and interfaces with MCU 42 to accept commands to generate vibration at a frequency selected from a range of frequencies, such as based upon a distance estimated between stylus 38 and an information handling system. In the example embodiment, haptic film 44 is covered with a silicon or fabric aesthetic skin 54 that provides a feeling similar to a writing pen. LED 46 is disposed at an end opposite writing tip 40 to provide illumination, such as with a current commanded by MCU 42. FIG. 2A depicts that LED 46 has a ring light pipe 60 or other transparent or translucent material to pass illumination to the outer surface. An LED circuit board 56 integrates an LED integrated circuit 58 on each of opposing sides to aid in achieving well-distributed illumination about the circumference of housing 52. FIG. 2B depicts that haptic film 44 includes a ribbon portion that interfaces with MCU 42 to accept a current that generates vibration with selectable frequency and amplitude. By locating haptic film 44 at the exterior surface of housing 52, vibration generated at the haptic film translates more readily to a surface on which stylus 38 rests, resulting in an amplification of sound generated by the vibration.

Figure 2C:
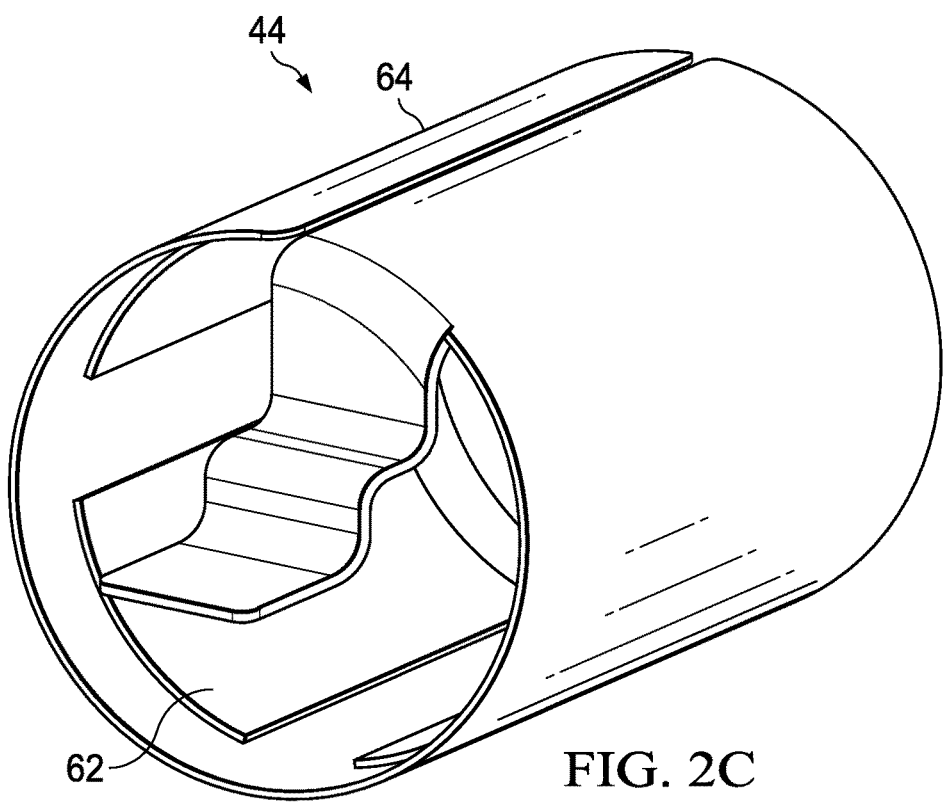
Figure 2D:
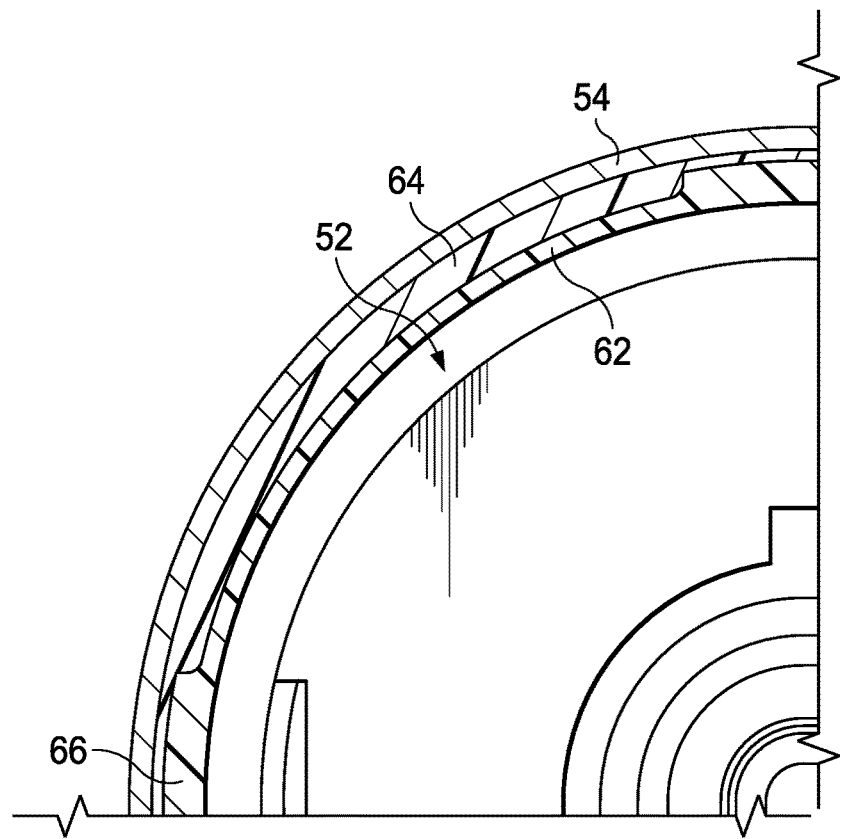

FIG. 2C depicts haptic film 44 separate from stylus 38 housing 52 with a seam that separates to fit around housing 52. A flexible printed substrate has plural haptic film actuators 62 coupled to an interior surface that generate the vibration in response to application of a current. As an example, haptic film actuator 62 is an electro-active polymer (EAP) material available from KEMET having a blend of high strain and high modulus material that allows flexibility and aligns molecules when voltage is applied to generate at vibration. In one example embodiment, voltage is applied by a first integrated circuit, such as the MICROCHIP HV56020 that provides simultaneous drive of multiple channels, and by a second integrated circuit, such as the MICROCHIP HV56022 that drives additional channels in time slices. By applying different types of alternating current of different frequencies and amplitudes to haptic film 44, different types of vibrations may be produced. FIG. 2D depicts a cross-sectional view of haptic film 44 as indicated by FIG. 2B. Flexible substrate 64 of haptic film 44 at the exterior of stylus housing 52 has a soft covering skin 54 and haptic film actuator 62 at an interior surface to generate vibration. A conforming spacer 66 may be coupled over haptic film actuator 62 to provide a more robust assembly.

Figure 3A:
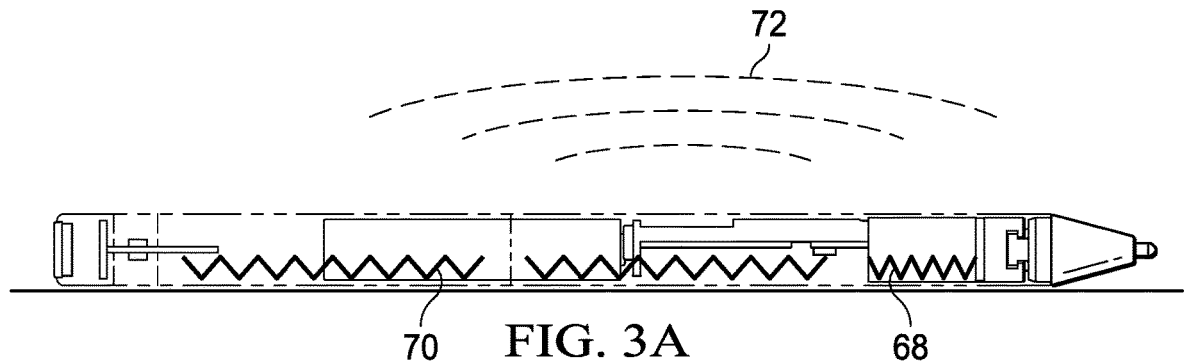
FIGS. 3A, 3B and 3C depict examples of sound and light generated at a stylus to aid in location of the stylus.
Figure 3B:
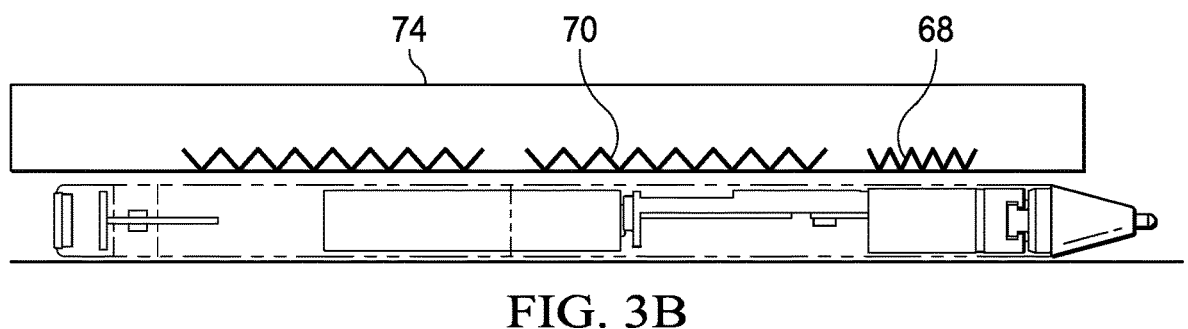
Figure 3C:
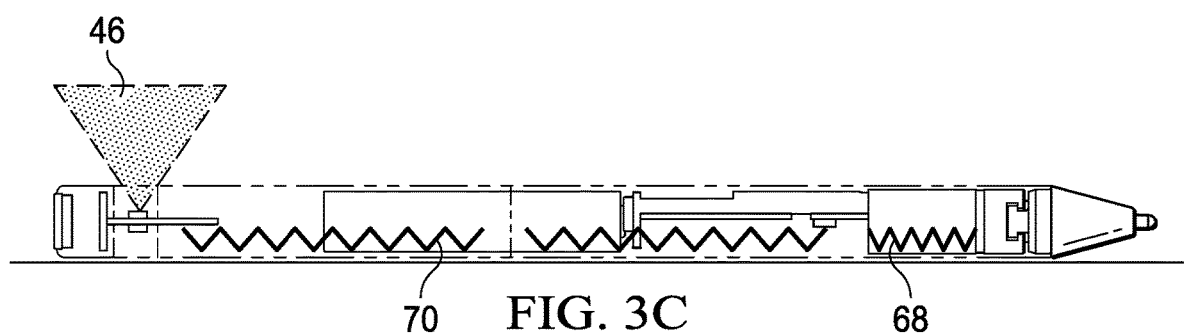

Referring now to FIGS. 3A, 3B and 3C, examples depict sound and light generated at stylus 38 to aid in location of the stylus. FIG. 3A depicts stylus 38 with haptic vibrations 68 generated by haptic film 44, which translate against a support surface, such as table or floor, to generate stylus vibrations 70 that in turn output an amplified sound 72 having sufficient noise level to be heard by an end user within a predetermined distance. The amount of noise output for a haptic film vibration frequency and amplitude depends upon a number of factors, including the location of the haptic film along the length of the stylus housing, the weight of the stylus and the type of underlying support. In order to create the loudest possible sound for a given power expenditure, a voltage form for application to haptic film 44 may be selected that generates a resonate vibration of stylus 38. FIG. 3B depicts an example of how stylus haptic vibration 68 acts upon an object 74 placed on top of the stylus to generate a stylus vibration 70 though the object 74, such as a book. Understanding how different environments generate different sounds provides a basis for adjusting vibration generated by the haptic film, such as based upon feedback of the sounds detected through a microphone at the information handling system or stylus or vibrations detected by an accelerometer in the stylus. FIG. 3 illustrates illumination of LED 46 along with vibration 68 of haptic film to generate stylus vibration 70. Both the vibration and the illumination consume battery power at the stylus. To minimize the power impact, vibration is adjusted based upon a distance of the stylus to an information handling system, and illumination is limited to situations where ambient light conditions indicated illumination will aid in location of the stylus, such as ambient light detected at the information handling system or stylus.

Figure 4A:
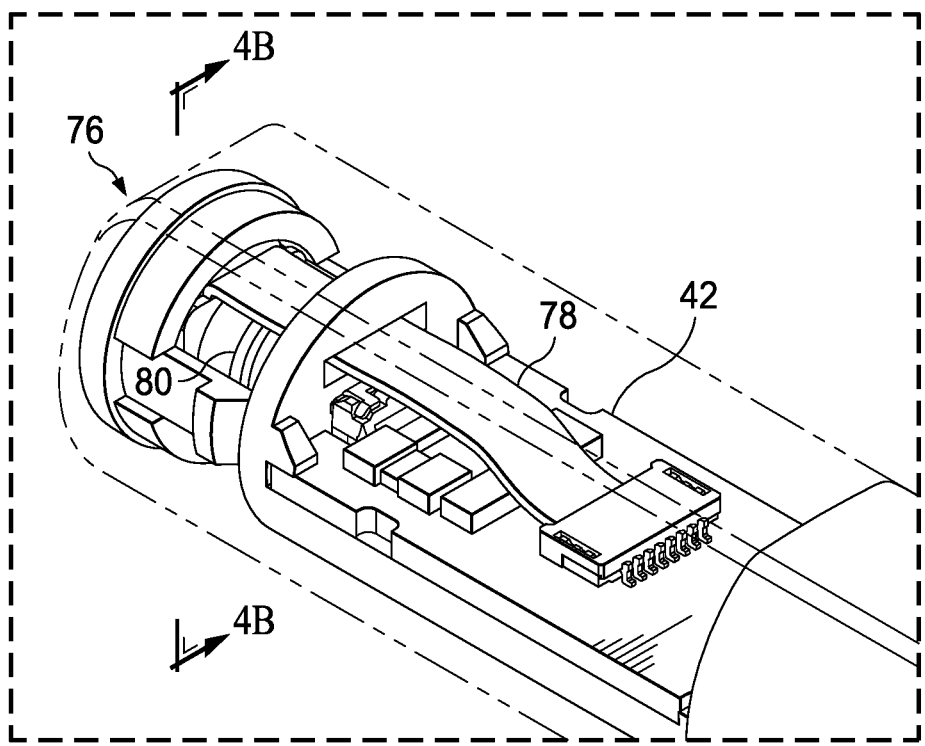
Figure 4B:
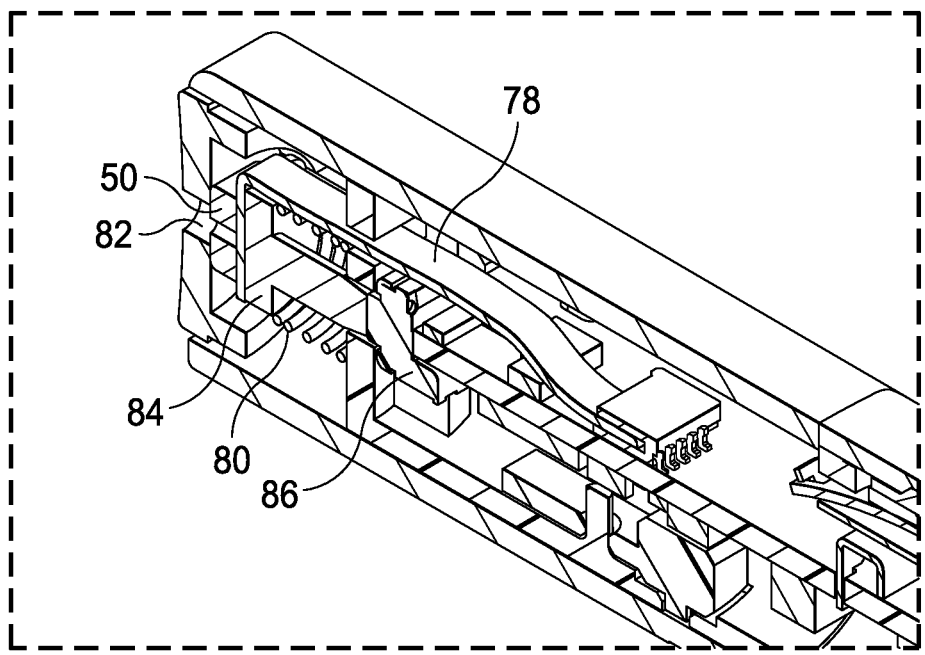

Referring now to FIGS. 4, 4A, 4B and 4C, an example embodiment depicts a stylus 38 that integrates a microphone 76 and haptic film 44 to aid in location of the stylus. Microphone 76 couples at an end of stylus 38 opposite writing tip 40, such as at a push button used to initiate BLUETOOTH advertisement from stylus 38. During ordinary usage, microphone 76 provides a convenient tool for an end user to input audible information, which is communicated to an information handling system through the radio. FIG. 4A depicts microphone 76 exposed at the stylus end next to a spring-loaded push button 80 and interfaced through a flexible cable 78 to a circuit board supporting MCU 48, which provides the audio information captured by microphone 76 to the radio of the WNIC. FIG. 4B depicts a cross-sectional view of microphone 76 to include a MEMS microphone device placed on the end of a launch button 84 biased out by spring 80 against an opening 82 through which sounds enter the microphone. A tactile switch 86 accepts inputs to initiate radio advertising and flexible cable 78 communicates microphone-captured audio information to the MCU. FIG. 4C illustrates that stylus 38 with microphone 50 provides an ability to directly monitor sound generated by vibration and also to detect sounds output by an information handling system. As one example, haptic vibration 68 is provided at a high frequency resulting in amplified sound 72 in an ultrasonic frequency range. Similarly, an information handling system speaker output ultrasonic sound 88 that is detected by microphone 50. Using ultrasonic sound to communicate between the stylus and information handling system provides positional information of the stylus, such as distance and a direction determined from a directional microphone of the information handling system, without generating audible information detectable by human hearing that can disrupt an end user's concentration.

Figure 5:
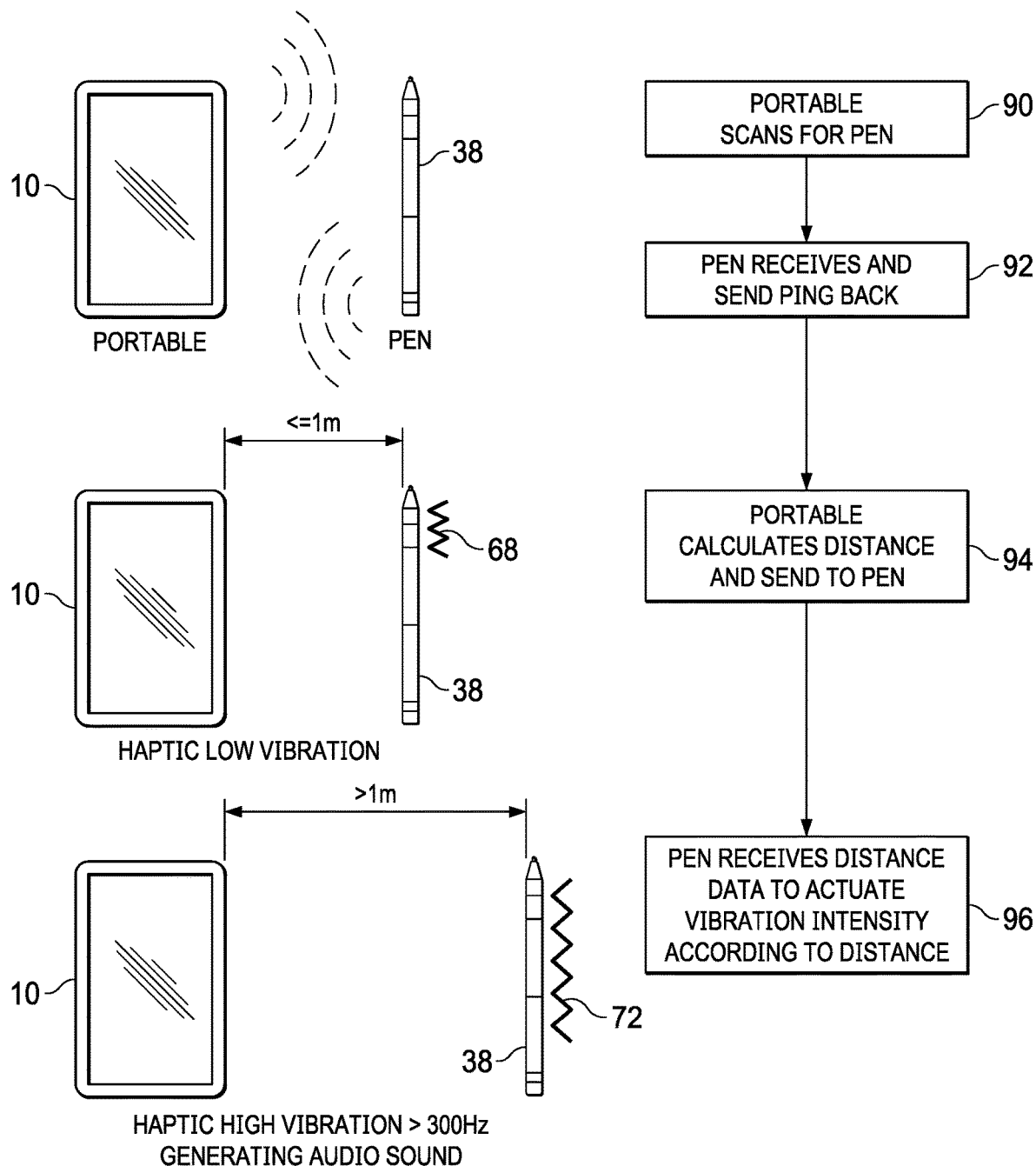
FIG. 5 depicts a flow diagram of a process for locating a stylus with variable haptic frequency noise based upon distance to the stylus.

Referring now to FIG. 5, a flow diagram depicts a process for locating a stylus with variable haptic frequency noise based upon distance to the stylus. The process starts at step 90 with a portable information handling system 10 scanning with a radio to establish communication with stylus 38, such as with a BLUETOOTH protocol advertisement. At step 92, stylus 38 receives the radio communication and responds to information handling system 10. At step 94, the portable information handling system determines a distance to the stylus, such as with High Accuracy Distance Measurement (HADM) or an analysis of a Return Signal Strength Indication (RSSI) and sends the distance to stylus 38 as a command to vibrate as a location aid to an end user. In an alternative embodiment, stylus 38 may perform its own determination of distance to the information handling system, such as in response to a command to vibrate. At step 96, stylus 38 receives the command and initiates vibration with the haptic film with a vibration frequency and amplitude set based upon the distance between the stylus and information handling system. For example, when the distance is less than a meter, the stylus may vibrate at a relatively low frequency and amplitude yet generate sufficient sound to be heard by an end user, thereby reducing power consumption. If the distance is greater than a meter, the stylus vibrates at a higher frequency to generate a greater audible noise. As an example, a high frequency vibration is 300 Hz up to 20 KHz. At 20 KHz, the sound generated by the vibration enters an ultrasonic range. Specific vibrations for a stylus may be set based upon vibration response and resonant frequencies so that optimal noise is output for a given power usage. Further, vibration levels may be adjusted based upon feedback, such as a determination that a vibration results from an object placed over the stylus, where the sound produced by the vibration may be captured by an information handling system microphone or a microphone integrated in the stylus. In such an instance, the end user may be provided with a user interface message indication that the stylus is likely hidden from sight under an object.

Figure 6:
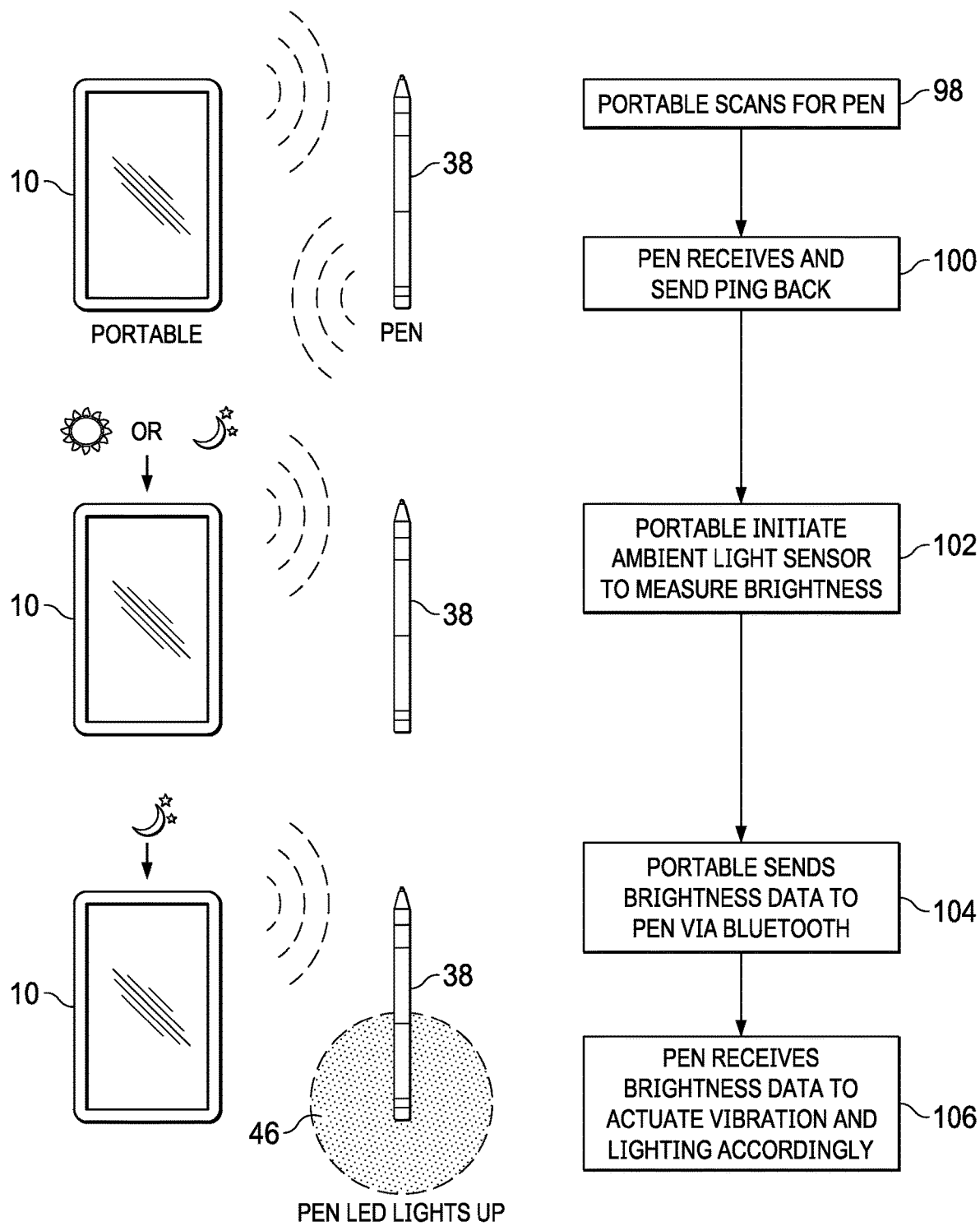
FIG. 6 depicts a flow diagram of a process for locating a stylus with illumination based upon ambient light detection.

Referring now to FIG. 6, a flow diagram depicts a process for locating a stylus with illumination based upon ambient light detection. The process starts at step 98 with portable information handling system 10 scanning for stylus 38 with radio communications and continues to step 100 with a response by the stylus to the portable information handling system. At step 102, portable information handling system 10 initiates a determination of the ambient light conditions to determine if illumination of an LED in the stylus will be visible to an end user. In one alternative embodiment, an ambient light sensor may be included in the stylus to measure ambient light conditions at the stylus for the stylus to determine if LED illumination will provide an effective location aid. At step 104, ambient light conditions are communicated by portable information handling system 10 to stylus 38. At step 106, the stylus receives the ambient light conditions and determines whether to illuminate the LED when ambient light is low or to vibrate with the haptic film when ambient light is high. In one alternative embodiment, both ambient light and vibration may be used simultaneously.

Figure 7:
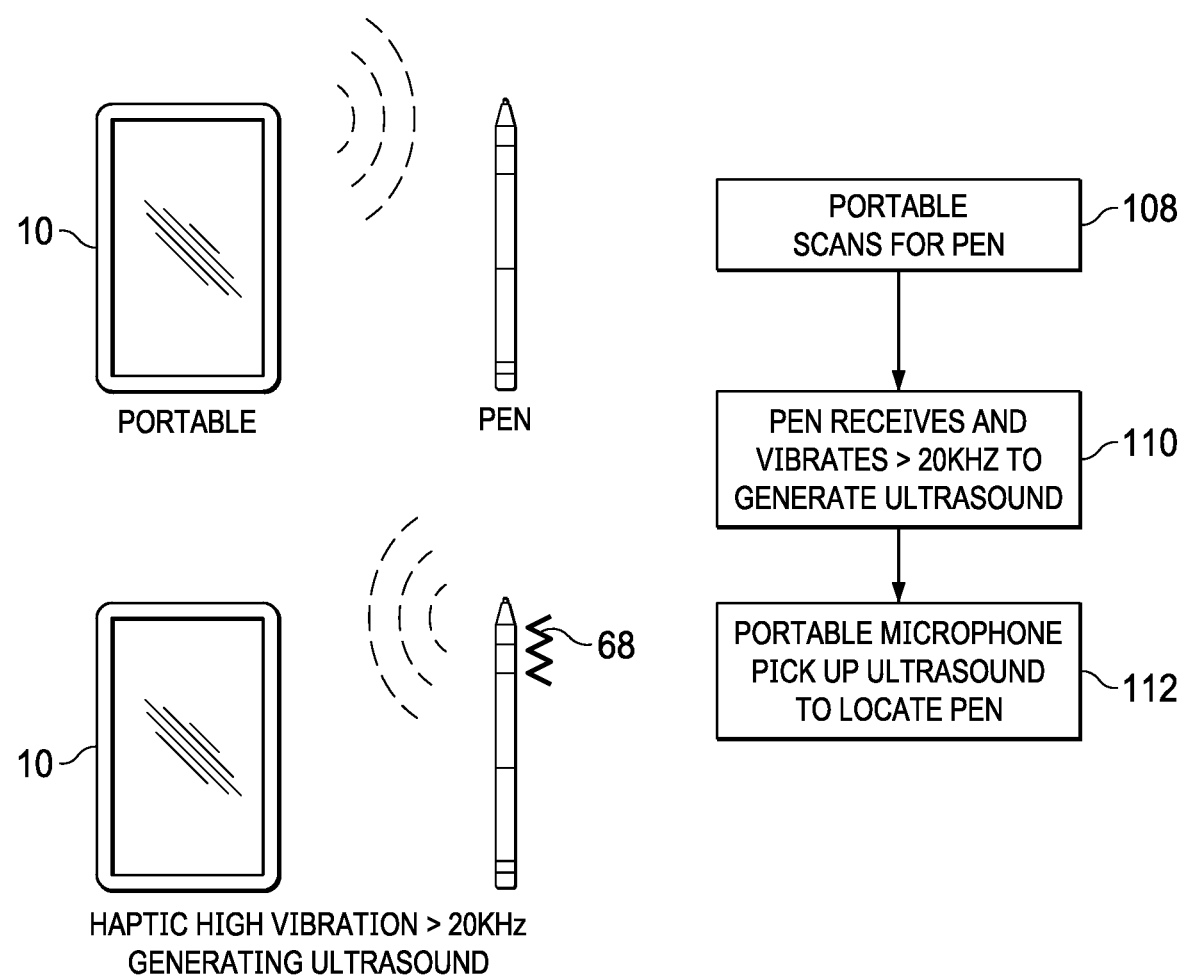
FIG. 7 depicts a flow diagram of a process for locating a stylus with vibration of a haptic film of the stylus detected by a microphone of the information handling system.

Referring now to FIG. 7, a flow diagram depicts a process for locating a stylus with vibration of a haptic film of the stylus detected by a microphone of the information handling system. In the example embodiment, the process starts at step 108 with portable information handling system 10 scanning for stylus 38 with a radio, such as BLUETOOTH advertisement. In an alternative embodiment, portable information handling system 10 may scan by playing an ultrasonic sound from a speaker. At step 110, the stylus receives the scan request and replies with an ultrasonic vibration of 20 KHz or greater to generate the ultrasound noise. At step 112, a microphone on the portable information handling system detects the ultrasound noise and applies the ultrasound noise to determine a direction and distance to the stylus. Using ultrasound avoids audible disruption to the end user and is detectable by ultrasound time of flight user presence detection devices found on some information handling systems. For instance, this approach allows an information handling system to track stylus location when the stylus is not in active use and thereby store a history of known positions.

Figure 8:
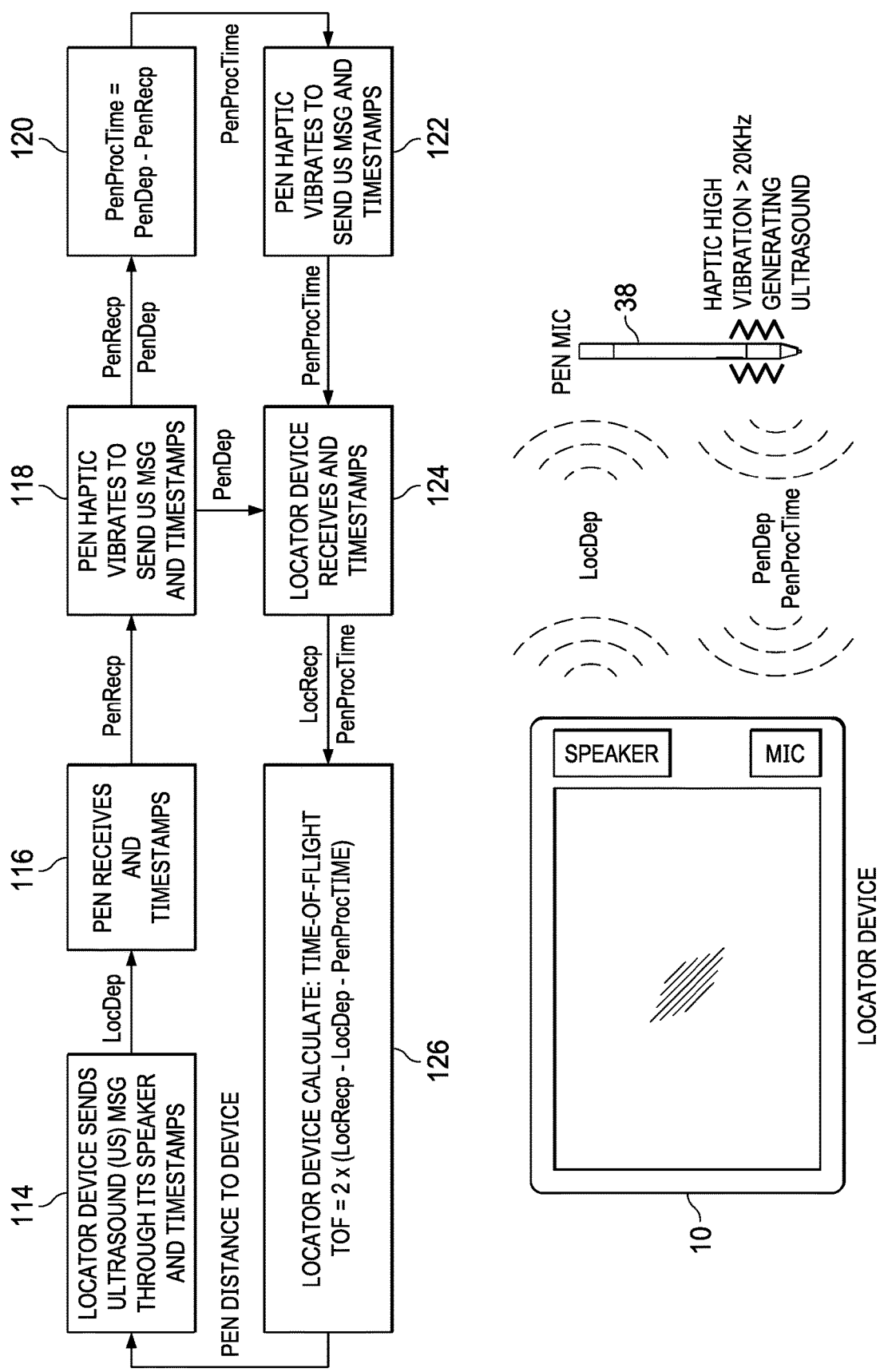
FIG. 8 depicts a flow diagram of a process for locating a stylus with ultrasonic sound detected at a microphone of the stylus.

Referring now to FIG. 8, a flow diagram depicts a process for locating a stylus with ultrasonic sound detected at a microphone of the stylus and an information handling system. The process starts at step 114 with a locator device, such as portable information handling system 10, sending and ultrasonic message through a speaker with a timestamp. For example, the ultrasonic sound is emitted with long and short sounds to indicate zero and one or with a first frequency to indicate zero and a second frequency to indicate one. Alternatively, a time stamp may be passed by a wireless network where available, such as BLUETOOTH or WiFi. For instance, a radio GPIO may be used to initiate playing of the ultrasonic sound so that radio transmissions provide a time reference. At step 116, the stylus receives the ultrasonic sound and timestamp with a microphone included in the stylus. At step 118, the stylus haptic film vibrates to generate an ultrasonic sound with a timestamp, such as with the same protocol as used by portable information handling system 10. At step 120 the stylus determines a time of flight for the ultrasonic sound to reach the information handling system by taking the difference of the timestamp for when the message was sent and the time for when the message was received. At step 122 the stylus uses the haptic film to generate an ultrasound message with the time of flight and sends the message to the information handling system. At step 124, the information handling system receives the message with the time of flight and with the stylus haptic film timestamp. At step 126 the information handling system determines a distance between itself and the stylus by determining a round trip time of flight for the ultrasonic sound between the stylus and information handling system. The distance is then determined by computing from the speed of sound. Although the example embodiment determines time of flight from two way ultrasound communication, in one embodiment a single time of flight may be used. For instance, a BLUETOOTH command may be used to initiate a single ultrasonic sound communication that is used to determine distance. Once a distance is determined between the information handling system and stylus, that distance may be used to select a haptic film vibration frequency that will be sufficient for an end user to notice.

Although the present invention has been described in detail, it should be understood that various changes, substitutions and alterations can be made hereto without departing from the spirit and scope of the invention as defined by the appended claims.

What is claimed is:

1. An information handling system comprising:
    a housing;
    a processor disposed in the housing and operable to execute instructions that process information;
    a memory disposed in the housing and interfaced with the processor, the memory operable to store the instructions and information;
    an embedded controller disposed in the housing and interfaced with the processor, the embedded controller operable to manage operating conditions in the housing;
    a radio disposed in the housing and interfaced with the processor, the radio operable to communicate with radios external to the housing;
    a stylus external to the housing and having a writing tip, a processing resource, a haptic device operable to vibrate at a frequency selected from a frequency range and interfaced with the processing resource and a radio interfaced with the processing resource;
    a non-transient memory disposed in the housing and operable to store instructions and information;
    a stylus locator having instructions stored in the non-transient memory that, when executed by at least one of the processors, the embedded controller or the processing resource, cause vibration of the haptic device at a frequency selected based upon a distance between the housing and the stylus;
    a microphone interfaced with the processor and operable to detect audible sound of the haptic device;
    wherein the stylus locator instructions analyze the audible sound to determine when the stylus is under an object.

2. The information handling system of claim 1 wherein the stylus locator instructions further:
    radio communication by a wireless personal area network protocol; and
    distance determined based upon the radio communication applying High Accuracy Distance Measurement (HADM).

3. The information handling system of claim 1 wherein the stylus locator instructions further:
    radio communication by a wireless personal area network protocol; and
    determine distance based upon the radio communication by applying a Radio Signal Strength Indicator (RSSI).

4. The information handling system of claim 1 wherein the haptic device comprises a haptic film operable to vibrate in range from a low frequency audible to human hearing to an ultrasonic frequency inaudible to human hearing.

5. The information handling system of claim 4 further comprising:
    a microphone operable to detect the ultrasonic frequency;
    wherein stylus locator instructions further command an ultrasonic frequency, detect the ultrasonic frequency, and apply the ultrasonic frequency to determine a direction to the stylus.

6. The information handling system of claim 5 further comprising:
    a speaker disposed in the housing and operable to output an audible noise; and
    a microphone disposed in the housing and operable to detect the audible noise;
    wherein the stylus locator instructions sense a time for audible noise to travel between the stylus and the housing to determine a distance between the stylus and the housing.

7. The information handling system of claim 6 wherein the audible noise has an ultrasonic frequency.

8. An information handling system comprising:
    a housing;
    a processor disposed in the housing and operable to execute instructions that process information;
    a memory disposed in the housing and interfaced with the processor, the memory operable to store the instructions and information;
    an embedded controller disposed in the housing and interfaced with the processor, the embedded controller operable to manage operating conditions in the housing;
    a radio disposed in the housing and interfaced with the processor, the radio operable to communicate with radios external to the housing;
    a stylus external to the housing and having a writing tip, a processing resource, a haptic device operable to vibrate at a frequency selected from a frequency range and interfaced with the processing resource and a radio interfaced with the processing resource;
    an ambient light sensor disposed in the housing and interfaced with the processor operable to determine ambient light at the housing; and
    a light disposed in the stylus and interfaced with the processing resource;
    a non-transient memory disposed in the housing and operable to store instructions and information; and
    a stylus locator having instructions stored in the non-transient memory that, when executed by at least one of the processors, the embedded controller or the processing resource, cause vibration of the haptic device when a stylus lost indication is detected;
    wherein the stylus locator instructions further command through the radios illumination of the light in response to a predetermined ambient light when the stylus lost indication is detected.

9. A method for locating a stylus from an information handling system, the method comprising:
- detecting a distance between the information handling system and the stylus;
- applying the distance to command a haptic vibration at the stylus with a frequency selected from a frequency range;
- detecting the audible noise with a microphone disposed in the stylus; and
- analyzing the audible noise to determine that the stylus is disposed under an object.

10. The method of claim 9 further comprising:
- vibrating a haptic film coupled at the stylus housing exterior to generate the haptic vibration; and
- generating an audible noise by interaction of the haptic vibration against a surface on which the stylus rests.

11. The method of claim 10 further comprising:
- comparing the detected audible noise with an expected audible noise for the selected frequency; and
- in response to comparing, estimating whether the stylus is under an object.

12. The method of claim 10 further comprising:
- vibrating the haptic film to generate an ultrasonic noise;
- detecting the ultrasonic noise with a microphone of the information handling system; and
- analyzing the detected ultrasonic noise to determine a direction to the stylus.

13. The method of claim 10 wherein the detecting a distance further comprises:
- vibrating the haptic film to generate an ultrasonic noise; and
- analyzing the ultrasonic noise to estimate the distance.

14. The method of claim 9 further comprising:
- detecting an ambient light; and
- when the ambient light is less than a predetermined ambient light, illuminating a light at the stylus.

15. The method of claim 10 wherein the haptic film comprises an electro-active polymer.

16. A method for locating a stylus, the method comprising:
- scanning from a portable information handling system with a wireless personal area network for a stylus;
- responding to the scanning from the stylus to the portable information handling system through the wireless personal area network;
- analyzing at the portable information handling system the stylus responding to estimate a distance between the portable information handling system and the stylus;
- communicating the distance from the portable information handling system to the stylus through the wireless personal area network; and
- in response to the distance, vibrating a haptic film coupled at the stylus exterior at a frequency selected from a range of frequencies based upon the distance;
- sensing ambient light at the portable information handling system; and
- when the ambient light is less than a predetermined ambient light, commanding illumination of a light at the stylus with the vibrating.

17. The method of claim 16 further comprising:
- detecting with a microphone at the portable information handling system an audible noise associated with the vibrating;
- comparing the audible noise with an expected audible noise for the distance and selected frequency; and
- determining from the comparing when stylus is under an object.

* * * * *